Feb. 27, 1940.  G. A. TINNERMAN  2,191,780
FASTENING MEANS
Filed Nov. 30, 1937
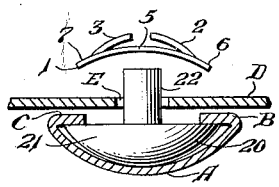
Fig. 1.
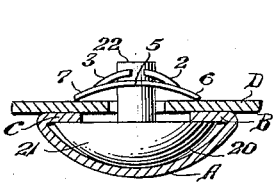
Fig. 2.
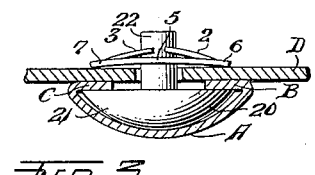
Fig. 3.
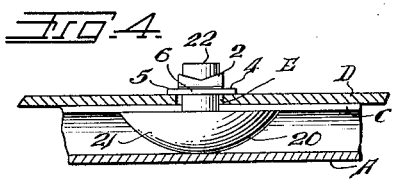
Fig. 4.
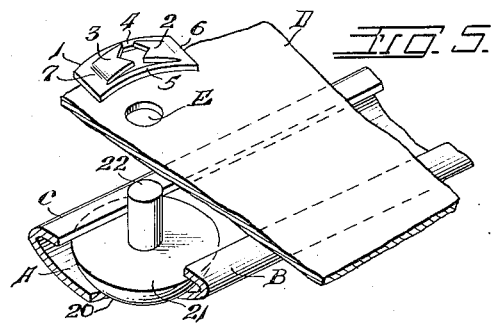
Fig. 5.
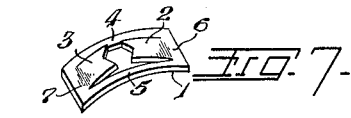
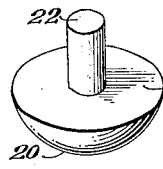
Fig. 7.
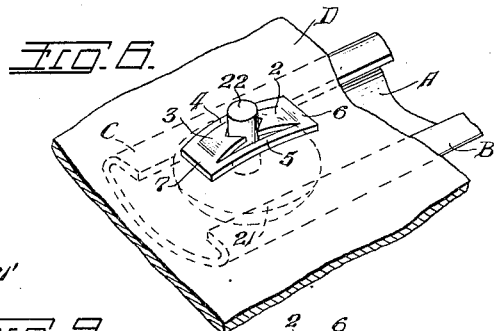
Fig. 6.
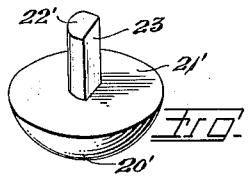
Fig. 8.
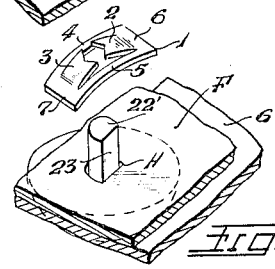
Fig. 9.
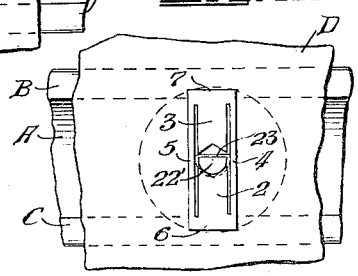
Fig. 12.
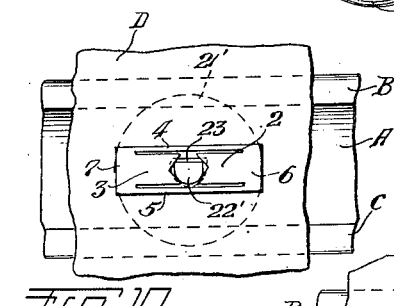
Fig. 10.
Fig. 11.
Inventor
GEORGE A. TINNERMAN
H. G. Lombard
ATTORNEY Patented Feb. 27, 1940

2,191,780

UNITED STATES PATENT OFFICE 2,191,780

FASTENING MEANS

George A. Tinnerman, Rocky River, Ohio, assignor to Albert H. Tinnerman, Cleveland, Ohio Application November 30, 1937, Serial No. 177,324

3 Claims. (Cl. 85—5)

This invention relates to molding installations, and the like, embodying means for attaching metallic moldings, metal trim or finishing objects to supporting structures, particularly metallic supports such as to be found in automobile bodies, metallic building structures, gas or electric ranges, metal partitions, door frames, window frames, refrigerator cabinets and many other similar assemblies. This application is a continuation in part of a copending application Serial Number 171,998, filed October 30, 1937.

More particularly, the present invention relates to improved means for the attachment of moldings and like objects to a supporting structure comprising connector or retainer devices effecting an interlocking engagement between the molding or other object and the supporting structure in combination with spring fastenings securing the retainer or connecting devices to the supporting structure under continuous spring tension thereby providing an installation in which the molding or trim object is fixed and rigid in applied fastening position and not subject to loosening, displacement or possible removal incident to vibration, jarring and strain.

Heretofore, metallic trim material has usually been attached to a supporting structure by means of wire or sheet metal clips having cooperative engagement with the molding or trim material and capable of being applied to apertures in the supporting structure in the manner of snap-studs. However, it has been found that snap-stud clips of this character, when employed in an installation subject to any material degree of strain and vibration as, for example, takes place in an automobile body, are inefficient and impractical in that they tend to work free from applied position to the extent that the trim material becomes loose and often completely removed resulting in an unsightly appearance and causing objectionable squeaks, rattles and other annoying sounds in the operation of the automobile.

Furthermore, in the attachment of relatively wide trim material, such snap-stud clips are impractical in that they must necessarily be constructed of wire or narrow sheet metal strip material, and consequently, no adequate, positive connection of the clips to the relative wide trim material may be obtained; it has therefore been necessary to attach relatively wide trim material by means of bolts provided with enlarged heads designed to seat within the molding and cooperate with conventional nut devices for securing the trim material to the supporting structure. However, the attachment of the trim material by means of such bolt fastenings is laborious and time consuming, requires the use of lock washers and is not always effective in that, even with the use of lock washers, the installation becomes loose by reason of the continuous jarring, vibration and strain incident to the operation of the automobile.

It is therefore a primary object of this invention to provide an arrangement for attaching superposed parts and securing finishing objects such as moldings and like trim material, to supporting structures without the use of threaded fasteners of any kind or of snap-stud clips, and in such manner that the part or object secured is installed in a fixed, rigid mounting under continuously effective spring tension and is not subject to loosening or displacement either in the connection of the retaining means with the object or part supported, or in the means for securing the assembly to the supporting structure.

Another object of the invention is to provide an installation comprising a hollow molding and rigid retainer devices such as rivets, or the like, for securing the molding in a fixed, rigid mounting on a support.

Still another object of the invention is to provide in such an installation an arrangement by which the mounting of the molding on the supporting structure is under continuous spring tension supplied by spring securing means cooperating with individual, rivet-like retainer devices assembled in the molding.

A further object of the invention is to provide an installation for attaching a molding to a supporting structure by retainer means comprising a rigid shank element designed for cooperative engagement with securing means comprising a spring locking plate having a yieldable element adapted to draw the molding toward the supporting structure in providing a fixed, rigid, resilient mounting.

A still further object comprehends in an installation embodying a rigid retainer such as a rivet, a spring locking plate for mounting a member on a support under a continuously effective spring holding action exerted axially by the locking plate on the shank of the retainer to draw and resiliently maintain the member mounted in close engagement with the support.

Another object of the invention is to provide in such an installation a rivet-like retainer for attaching an object to a supporting structure comprising a threadless shank adapted for locking engagement with a spring locking plate.

Still another object of the invention is to provide in such an installation a rivet-like retainer cooperating with a spring locking plate for attaching an object to a supporting structure and comprising a threadless shank member having a cutaway portion permitting disassociation thereof from fastening engagement with the locking plate.

Further objects and advantages of the invention will be apparent to those skilled in the art as a description thereof proceeds with reference to the accompanying drawing in which like reference characters designate like parts throughout the same, and in which:

Figs. 1 to 3 inclusive illustrate the several steps in the assembly of the respective members and the mounting of the improved molding installation, Fig. 1 showing a rivet-like retainer assembled in a molding preparatory to being secured to an apertured support by a spring locking plate;

Fig. 2 is a similar view showing the spring locking plate as initially applied to the shank of the retainer and untensioned;

Fig. 3 shows the position of the spring locking plate as tensioned in applied fastening position rigidly locking the molding to the support in a completed installation;

Fig. 4 is a longitudinal section through a molding installation such as represented in Fig. 3 showing the interlocking relation of the rivet-like retainer within the molding and as secured to the support by the spring locking plate;

Fig. 5 is a bottom perspective view showing a retainer as assembled in a molding preparatory to the application thereof to the support to be secured by a spring locking plate;

Fig. 6 is a similar view showing the assembled molding and retainer as applied to the support and secured by a spring locking plate;

Fig. 7 is a perspective of a spring locking plate per se;

Fig. 8 is a perspective of a form of rivet-like retainer;

Fig. 9 is a perspective of another form of retainer having on its shank a reduced or cutaway portion to provide a substantially D-shaped shank;

Figs. 10 and 11 show a molding installation embodying the form of rivet-like retainer shown in Fig. 9 having a D-shaped stud for permitting disassociation of the locking plate therefrom by relative rotary movement, Fig. 10 showing in plan the locking plate in locked engagement with the D-shaped shank of the retainer in applied fastening position securing the molding to the support;

Fig. 11 is a similar view of the installation represented in Fig. 10 with the locking plate ninety degrees removed from applied fastening position thereby permitting the locking plate and retainer to be disassociated; and, Fig. 12 is a perspective of a further embodiment of the invention showing an installation comprising superposed apertured members secured by a retainer having a D-shaped shank such as illustrated in Fig. 9 for preventing relative rotary or shifting movement of the members secured.

Referring now, more particularly, to the drawing, Figs. 1-6 inclusive show a molding installation embodying a preferred form of retainer means assembled in the molding in interlocking engagement therewith and secured to a supporting structure of any suitable character by a spring locking plate. The letter A designates generally a fragment of a well-known form of metallic molding comprising a channel-shape and inturned base flanges B, C. The supporting structure is designated generally D, and inasmuch as the instant invention is intended mainly for use in the construction of metallic structures, such supporting structure usually consists of a metallic panel or plate-like element, as illustrated. In order that the molding, trim material or other finishing object may be secured thereto, said supporting structure D is provided with perforations E, disposed at regular intervals and at suitably spaced points along which the trim material extends in mounted position. Such perforations may be of any suitable contour but preferably are round, as shown in Fig. 5, to snugly receive the substantially round shank of the rivet-like retainer most effectively in a completed installation. The said perforations may be provided in the member constituting the support as by punching prior to the application of the molding thereto or the installation thereof as a part of a completed structure, and may also be formed in any other convenient manner as by drilling.

The molding which is to be mounted in accordance with the present invention is usually in the form of a channel-shaped strip although it is contemplated that the method and means of the instant invention be employed in securing moldings and finishing objects of any other configuration or cross-section. As shown in Fig. 5, the sides of the molding or trim material are each bent inwardly providing abutments or base flanges B, C, extending continuously along each side of the channel-shape and adapted for interlocking engagement with the retainer or connecting means on being mounted to the support as hereinafter set forth. The body of the molding intermediate the base flanges or abutments may be of any desired configuration or design for ornamental and artistic purposes. However, for the purposes of the present invention, directed to the general combination, it is only necessary that the molding, trim strip, or other finishing object be provided with some form of abutment means, or the like, on the underface thereof adapted for cooperative engagement with a form of rivet-like retainer having a shank element which may be secured to the supporting structure by a spring locking plate presently to be described.

As shown in Figs. 4 and 6, the molding A is attached to the support D by means of one or more retainers 20 disposed in interlocking relation with the base flanges B, C, of the molding and secured to the supporting structure D by means of spring locking plates 1, having locking engagement with the shanks of the retainers passing through apertures E provided in the supporting member.

The retainer 20, Fig. 8, is preferably in the form of a substantial rivet-like device comprising an enlarged head 21 and a shank element 22. The said head is preferably of such shape as to correspond substantially to the inner contour of the molding to have interlocking abutting relation with the base flanges B, C and otherwise seat therein in snug engagement with the roof thereof substantially as shown in Figs. 4 and 5.

The spring locking plates 1, Fig. 7, are provided from relatively thin sections of sheet metal, cold rolled metal, spring steel, or the like and may be round or of any other suitable configuration but, quite obviously, are most economically constructed from substantially rectangular sections obtained from strip stock. Such a section providing a spring locking plate is suitably slit and formed within its periphery to present a plurality of yieldable tongues 2, 3, or the like, projecting out of the plane thereof and adapted for frictional locking engagement with the shank of a retainer under spring tension. As shown, a preferred form of spring locking plate comprises opposed, yieldable tongues 2, 3, extending upwardly intermediate bridge portions 4, 5, and end portions 6, 7, providing, what may be termed, the body of the locking plate, which body is readily flexible and is so formed in the stamping operation as to have a pronounced, generally concave configuration in normal, untensioned relation. Since the body of the locking plate is flexible, the tongue elements 2, 3, are necessarily relatively yieldable with respect to each other and readily adapted for sliding engagement with the shank of a retainer in one direction in the manner of a clutch, and accordingly, may be speedily applied to fastening position by a substantial axial, thrust-like motion in a minimum of time and effort and flattened in such fastening position thereby fixedly securing the assembled members of an installation under continuously effective spring tension, as hereinafter more fully set forth.

From the foregoing it will be understood that a molding, trim strip or other finishing object may be secured to a supporting member by means of rivet-like retainers and spring locking plates, above described, in substantially the following manner. The retainers are assembled by sliding the head sections 21 thereof into the channels of the moldings from either end thereof. Since the width of the head sections corresponds substantially to the inside width of the moldings between the corners formed by the inturned base flanges B, C, the retainers are disposed in interlocking relation therewith and may be freely slid lengthwise of the molding without possibility of becoming removed. As many of such retainers as necessary, depending on the length of the molding, are applied in this manner and are so positioned therein that the shanks 22 are disposed in such spaced relation as to correspond substantially with the spacing of the apertures E provided in the preperforated supporting structure D. The molding provided with the retainers assembled therein in such suitable spaced relation is then brought to the preperforated supporting member and the shanks 22 of the retainers fitted into the perforations and the molding pressed into snug engagement with the adjacent surface of the support with said shanks 22 projecting therethrough onto the reverse side as illustrated in Figs. 1 and 5. The spring locking plates 1, are then applied to the projecting shanks of the individual retainers and pressure exerted in a substantial axial, thrustlike movement by which the yieldable tongues 2, 3, thereof are caused to slide along the shanks 22 to the point at which the end portions 6, 7, of the generally concave base, contact the adjacent surface of the supporting member substantially as shown in Fig. 2. At such point, upon continued pressure on the generally concave base of the locking plate, the end portions 6, 7 thereof are moved from their initial normally untensioned position in the generally concave base outwardly and upwardly in a substantial lifting force which is transmitted to the tongues to urge the notched extremities thereof inwardly toward each other to the extent that the said tongues are caused to dig into and become embedded in the shank of the retainer under spring tension and thereby resist any tendency toward reverse movement or loosening. At the same time, the bowed bridge portions 4, 5, Figs. 3 and 6, are elongated such that the generally concave base of the locking plate is tensioned and assumes the position of a substantially flat section, Fig. 3, which, in attempting to assume its initial, normally untensioned concave configuration naturally tends to draw the shank of the retainer axially thereby taking up any clearance in the assembled parts and rigidly securing the molding or other connected part to the supporting structure under continuous spring tension. In this way the spring locking plates serve to exert a continuously effective spring holding action axially of the shanks of the retainers thereby initially drawing the molding into snug, rigid engagement with the supporting structure and thereafter maintaining a firm, fixed engagement of the parts of the installation without possibility of becoming loose or removed under the most extreme conditions of jarring, vibration and strain and over long periods of use.

As stated, this most advantageous axial drawing action supplied by the spring locking plates to provide a tight, rigid installation, is effected by the tensioned end portions 6, 7 and bridge portions 4, 5 which are moved from their pronounced, concave configuration when normally untensioned, as represented in Fig. 2, to assume the position of a substantially thin, flat section in final applied position as shown in Fig. 3. It has been found that this most effective locking and drawing action of the spring locking plates to provide a tight, rigid installation is best obtained when the generally concave bases thereof are flattened without any substantial pressure being exerted on the tongue elements themselves; any substantial pressure on the tongues prevents the locking plate from having smooth, sliding engagement with the shank of the retainer on being applied, and also bends the tongues with respect to the generally concave base such that the extremities thereof are deformed out of most effective contact with the cooperating shank, wherefore the tongues may have a tendency to slip and permit the locking plate to loosen from applied position in a tightened installation. This application of the spring locking plates is preferably effected by the use of a special tool comprising spaced jaws which may be fitted to the bridge portions 4, 5 of the generally concave base of the locking plates without contacting the tongue elements. Thus, by substantial axial thrust, pressure may be applied to the bridge portions to flatten and tension the same in the generally concave base without deforming the tongues; and accordingly when the tool is withdrawn and the attendant pressure removed from the said flattened bridge portions, the tension stored therein causes the tongues to become embedded in the shank by substantial line contact and, at the same time, necessarily causes an axial drawing action on the shank of the retainer thereby providing a locked, tightened installation. A tool of the character just described is illustrated in a copending application Serial Number 161,323, filed August 27, 1937.

In certain installations, it is necessary or desirable that the spring locking plate be removable from locking engagement with the shank of the retainer in order that the members of the installation may be disassociated to permit access to concealed parts or to replace a damaged member. Figs. 10 and 11 show a molding installation embodying a modified form of retainer such as represented in Fig. 9, in which the shank thereof is provided with a cutaway portion whereby a quick, simple, relative, rotary movement disposes the extremities of the tongues of the locking plate out of engagement with the shank of the retainer thereby permitting the same to be removed. As shown in Fig. 9, the modified form of retainer 20' comprises an enlarged head 21' and a projecting shank 22' having a portion thereof cut away to present a flat face 23 and otherwise forming the said shank into a substantially D-shape stud in cross-section. Thus, as shown in Fig. 10, in a completed installation, the D-shaped shank 22' in one position is readily engaged by the tongues 2, 3 of the spring locking plate in the manner described above with reference to the form of the invention shown in Figs. 1 to 6 inclusive, to firmly and rigidly retain the assembled members in applied position. If, however, it is desired to remove the locking plate from such locking relation, it is only necessary to rotate the same ninety degrees relative to the D-shaped shank 22', to the position illustrated in Fig. 11 whereupon the flat cutaway 23 of the shank is disposed in the space between the extremities of the tongues, in which relation the extremities of the tongues are out of contact with the shank and there is sufficient clearance to allow the locking plate to be removed, and the shank of the retainer to be withdrawn, thereby permitting the members of the installation to be disassociated.

Fig. 12 shows a further embodiment of the invention in which a retainer means comprising a D-shaped shank is utilized to provide a fixed, rigid engagement in an installation comprising superposed apertured members otherwise subject to possible shifting or relative rotary movement. As shown, the superposed members F, G are each provided with substantially D-shaped openings H, of a size to permit passage of the D-shaped shank 22' when aligned. Inasmuch as the shank is substantially D-shaped and the aligned apertures of the superposed members F, G of a substantially corresponding D-shape, the flat face 23 of the shank element may be so fitted into said aligned apertures as to contact the straight side walls thereof presented by the D-shaped openings, thereby preventing lateral displacement or relative shifting movement of the assembled members in any direction and particularly eliminating any possible relative rotary movement. The application of the spring locking plate to the projecting portion of the shank is substantially similar to the procedure described with reference to the form of the invention represented in Figs. 1 to 6 inclusive. And since the shank is D-shaped, it is quite obvious that the spring locking plate may be removed therefrom by relative rotation substantially in the manner described with respect to Figs. 10 and 11.

While this invention has been described in detail with specific examples such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive, the scope of the invention being indicated by the appended claims rather than the foregoing description.

What is claimed is:

1. Fastening means comprising a cooperating retainer and spring locking plate, said retainer including a substantially D-shaped stud having a substantially flat side face and a generally curved side portion, said spring locking plate comprising a pair of cooperating tongues for engaging said stud, one of said tongues being provided with a recess in its extremity adapted to receive the curved portion of said stud in one position such that the extremities of said tongues are out of fastening engagement therewith, the extremities of said tongues otherwise being of such spacing as to positively engage said substantially D-shaped stud at points other than said flat side face thereof in the applied fastening position of the spring locking plate therewith, said locking plate and stud being separable from such applied fastening position upon relative movement to dispose the extremity of one of said tongues of the locking plate substantially opposite said flat side face of the D-shaped stud with the generally curved side portion thereof received in said recess in the extremity of the other tongue.

2. Fastening means comprising a cooperating retainer and spring locking plate, said retainer including a substantially smooth threadless shank in the form of a substantially D-shaped stud having a substantially flat side face and a generally curved side portion, said spring locking plate comprising a generally concave base having a pair of cooperating tongues struck and formed therefrom to project out of the plane thereof in position for engaging said stud, one of said tongues being provided with a recess in its extremity adapted to receive the curved portion of said stud in one position such that the extremities of said tongues are out of fastening engagement therewith, the extremities of said tongues otherwise being of such spacing as to positively engage said substantially D-shaped stud at points other than the flat face thereof in the applied fastening position of the spring locking plate on said stud, said generally concave base of the spring locking plate in such fastening position operating to draw said stud axially to tighten the installation under continuously effective spring holding action, said locking plate and stud being separable from such applied fastening position upon relative movement to dispose the extremity of one of said tongues of the locking plate substantially opposite said flat side face of the D-shaped stud with the generally curved side portion thereof received in said recess in the extremity of the other tongue.

3. Fastening means for securing superposed parts one of which is provided with an opening having a straight side wall, said fastening means comprising a cooperating spring locking plate and retainer including a substantially D-shaped stud having a flat side face and a generally curved side portion, said stud being received in said opening with said flat side face thereof contacting the straight side wall of said opening thereby preventing relative rotary movement thereof in fastening position on said part, said spring locking plate comprising a pair of cooperating tongues for engaging said stud, one of said tongues being provided with a recess in its extremity adapted to receive the curved portion of said stud in one position such that the extremities of said tongues are out of fastening engagement therewith, the extremities of said tongues otherwise being of such spacing as to positively engage said substantially D-shaped stud at points other than said flat side face thereof in the applied fastening position of the spring locking plate therewith, said locking plate and stud being separable from such applied fastening position upon relative movement to dispose the extremity of one of said tongues of the locking plate substantially opposite said flat side face of the D-shaped stud with the generally curved side portion thereof received in said recess in the extremity of the other tongue.

GEORGE A. TINNERMAN.